INVENTOR.
WILLIAM A. STAMPLER
BY Edward J. Feeney Jr.
ATTORNEY

FAST ACCESS CONTENT-ORGANIZED DESTRUCTIVE READOUT MEMORY

Filed July 31 1967 6 Sheets-Sheet 2

INVENTOR.
WILLIAM A. STAMPLER

BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER
BY Edward J. Feeney Jr.
ATTORNEY

United States Patent Office 3,508,220
Patented Apr. 21, 1970

3,508,220

FAST ACCESS CONTENT-ORGANIZED DESTRUCTIVE READOUT MEMORY

William Stampler, Hatboro, Pa., assignor to Burrougs Corporation, Detroit, Mich., a corporation of Michigan

Filed July 31, 1967, Ser. No. 657,210
Int. Cl. G11c *11/02, 15/00*
U.S. Cl. 340—174 9 Claims

ABSTRACT OF THE DISCLOSURE

A content organized (in descending or ascending order) memory which incorporates both conventional structure addressing and a new form of content addressing in which only one bit of a word is read out at a time during a search operation. In searching the contents of the memory, bit sequencing hardware and comparison circuits sequentially reads out each bit, from the most significant to the least significant, in the memory and provides an indication of equality or inequality with the respective bit of a reference word. When the comparison indicates equality, the next bit in the same word is selected for comparison; however, if the comparison indicates inequality, the same bit in succeeding words is sequentially selected until equality is indicated. In this manner the least significant bit which matches the corresponding reference word bit is ultimately registered. An indication that the reference word matches the stored word, or that no such word exists in the memory, may be achieved without interrogating all words in the memory.

A hardware-implemental "push cycle" content organizes words prior to inserting them into the memory. A delete cycle removes words and eliminates "empty" locations in the memory.

CROSS REFERENCES TO RELATED APPLICATIONS

A related copending application is entitled "Small Low Cost Memory," by Edward Myers and John Port, S.N. 542,586, filed Apr. 14, 1966, now U.S. Patent No. 3,439,345. Another related copending application is entitled "Display System," by M. Lasoff et al., S.N. 557,194, filed June 13, 1966. The contents of both of these applications are incorporated into this application by this reference.

BACKGROUND OF THE INVENTION

Field of the invention

Most present-generation computer memories employ some form of "structure addressing" in which data is stored at a definite location or machine address. To retrieve data, the machine address must be known or computed before the data can be accessed. However, in the execution of certain types of programs, it is necessary to search through an entire data memory one word at a time until either the desired word is located or it is determined that the word is not in memory. When using a memory built primarily for structure addressing, such memory searches are inefficient and time consuming and, therefore, costly in terms of computer time.

Description of the prior art

Some computers utilize a "content-addressed" memory in which the accessing of the desired word is not based primarily on its machine address, but instead is usually based on examing a designated portion of the word itself. Such memories are often called associative memories. In general, the order in which data words are placed in such a memory is not always significant because of the accessing methods that are used, but in the memory being disclosed, the order in which words are stored in memory becomes significant.

Although the use of a content-addressed memories for certain applications has distinct advantages over the conventional memory, the use of a large size associative memory appears to be rare at this time, possible because of the cost and technical difficulties involved in designing and producing them.

BRIEF SUMMARY OF THE INVENTION

The present invention provides a memory device which provides the reading out and testing of only one bit of a word in a memory search (memory accessing), as opposed to reading out and testing (comparing) the entire memory word. It provides the elimination of the write cycle when no binary ONE's are read out from a destructive-readout type memory. It provides the use of a "push cycle" to organize an entire portion of a computer memory so that it is content organized; that is, arranged in numerical order. This disclosure selects ascending order, but descending order could be used with a slight change in logic.

The present invention uses a hardware-implemented "push cycle" to put words in order before inserting them into memory. It also provides the use of a hardware-implemented delete cycle to remove (erase) words from a computer memory and to eliminate these "empty" locations from memory automatically, to thereby conserve memory space.

It is therefore a primary object of the present invention to provide a memory which combines the advantages of structure addressing and content addressing into one memory, so it can be used efficiently for either purpose. It can also be used for both purposes at once. For example, one portion of a large memory could contain the program, a second portion could be used for conventional data storage purposes or as a "scratch pad," while the third portion of the same memory would be content-organized for content addressing using the invention disclosed herein.

BRIEF DESCRIPTION OF THE DRAWINGS

The present invention may be best described and understood by reference to the accompanying drawings in which.

DETAILED DESCRIPTION

Figure 1:
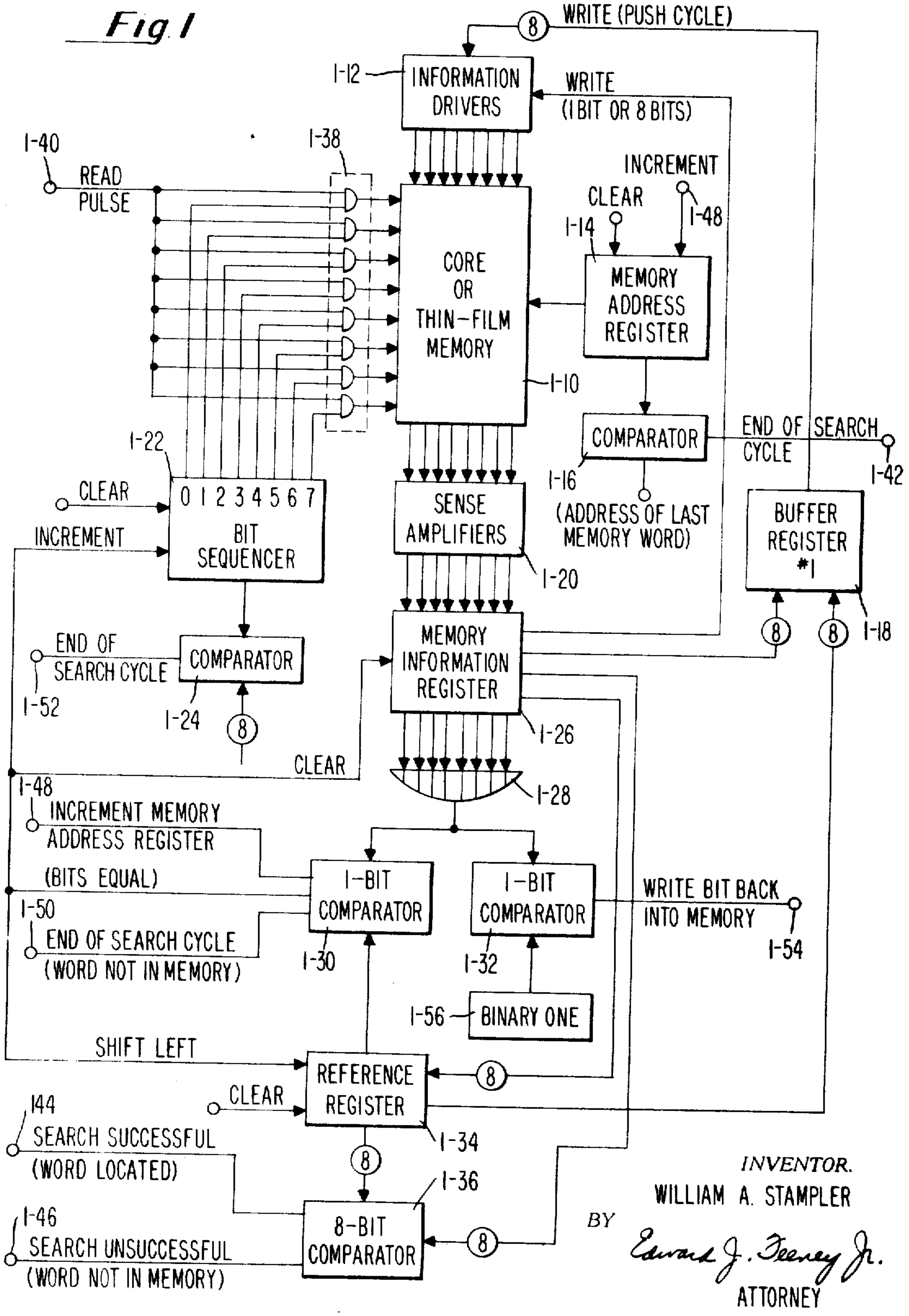
FIGURE 1 is a block diagram of the memory system.

Following is a brief description of the features and characteristics of the memory being disclosed, plus a generalized description of its operation. Greater detail is given in the following description and in the algorithms presented later. Words are placed in memory so that they are in numerical order (content organized) insofar as the portion of the word used for accessing purposes is concerned. The memory incorporates extra buffer register(s) and gating means to implement a push cycle similar to that developed by the present assignee for its Agent Set. This Agent Set is disclosed in the copending application entitled "Display System" previously noted. The memory incorporates logic so that this "push cycle" can be effectively reversed in what is called a "delete" cycle in this disclosure. In this delete cycle, unwanted words are deleted and the appropriate portion of the memory moved forward in one memory cycle, to eliminate "empty" word locations from the memory.

With the memory arranged in numerical order (content organized) only one bit at a time need be read out and compared with the resepctive bit of a reference word. This feature simplifies the logic and decreases the cost. If the bit read out of memory is a ZERO, no write cycle is required because the word that was accessed was not altered or destroyed. A write cycle is required only when a ONE is read from memory. In the disclosed system of memory accessing, an average of only 25 write cycles is required in accessing words that have 48 bits designated for accessing purposes, regardless of the number of words stored in the memory.

The time required to access a word in the disclosed system is essentially independent of the memory read-write cycle because a write cycle is seldom required. Instead the accessing speed depends almost entirely on the speed of the read cycle, and how fast successive read cycles can be made. The cycle time and access time (per word) for a pair of known memories are listed below for reference:

| | Fast memory | Slow memory |
|---|---|---|
| Cycle time (including write cycle) | 0.5 μsec. | 4.0 μsec. |
| Access time (read only) | 0.25 μsec. | 0.8 μsec. |

It is seen by this illustration that with a high speed memory, the access speed may be doubled (.5 μsec. to .25 μsec.) when "read only" is required, while the access speed may be increased by a factor of 5 (4.0 μsec. to 0.8 μsec.) in memories having slower operating speeds.

In the disclosed system of accessing a desired word from memory, the average number of write cycles required equals ½ the "accessing" word length, plus one, regardless of the number of words in memory. For example, in a memory in which 30 bits would normally be examined in content addressing, only 16 write cycles would be required (on the average) during a memory search for a word that already exists in memory. In a conventional memory search of a structure-addressed destructive-readout memory an average of ½ of the contents of the entire memory have to be written back during a single memory search. Normally in a conventional structure addressed memory, the entire contents would have to be examined to determine that a referenced word did not exist in memory. Each memory word would have to be read out and compared to the reference word (and written back into memory again, in the case of destructive readout memories). With the disclosed method of organizing or arranging the words in memory, only slightly over half the contents of the memory (and only one bit of each word in most cases) would have to be read out to definitely determine that the referenced word did not exist in memory. At the end of a memory search, the disclosed logic generates one of two signals, indicating one (but not both) of the following conditions:

(a) The referenced word exists in memory at the machine location contained in the memory address register (MAR).

(b) The referenced word does not exist in memory.

If an attempt were made to write a word at a location where a word already is stored having a similar reference identification, the logic signal could be interpreted as indicating a programming error. Thus an attempt to make two separate entries under the same social security number could be caught and prevented. Similarly, an attempt to issue the same license number to two different motor vehicles would be recognized and prevented.

The following criteria may be used for arranging the contents of the memory:

*Name.*—Alphabetical listings for use by department stores, banks, government, etc. In this case the memory can be compared to a telephone directory, in which a "memory search" is made to locate a name. The information associated with the name (telephone number) is then retrieved for use.

*Number.*—Listing by social security number (government), by employee number (factory payroll), by document number, etc.

*Age.*—Draft status, retirement eligibility, etc.

*Length of service.*—Vacations, automatic pay increase, insurance coverage, etc.

*Numerical order.*—Results of multiple calculations, for statistical analysis.

*Fingerprint identification.*—If fingerprints are converted into digital form for automatic processing, the digital data could be quickly filed and retrieved by using the content-organized approach described herein.

Referring particularly to the illustration in FIGURE 1, the general principles of operation are given in the following description of a memory search. First the words are arranged in numerical order in the memory. The word that determines which memory word is being searched for is called a "reference" word in this disclosure. This reference word is placed in the reference register 1–34 shown in FIGURE 1. This register 1–34 is capable of being shifted to the left (end-around).

The logical circuitry includes a bit sequencer 1–22 which determines which bit of a memory word is to be read out of memory 1–10 and compared with the corresponding bit in the reference register 1–34. This bit sequencer is cleared to zero before the search cycle starts. Bit 0 corresponds to the most significant bit of the reference word. Also included is a conventional memory address register 1–14 (MAR) which is set to the machine address of the memory word being accessed. This MAR 1–14 is cleared to zero, or set to the machine location of the first word of the content-organized portion of the memory. The logic further includes a conventional memory information register 1–26 (MIR) which is also cleared at this time. The MIR 1–26 normally contains the contents of the last word read out from memory 1–10. However, during a search cycle, the MIR 1–26 usually contains only one bit of the memory word.

With the initial conidtions set up as described above, the search cycle can start. Accordingly, bit 0 of the memory word corresponding to the contacts of the MAR 1–14 is read into the MIR 1–26. If the bit read from memory 1–10 is a ONE, as noted by comparator 1–32, it is immediately written back into memory 1–10 while being retained in the MIR 1–26. This bit is then compared with bit 0 of the reference register 1–34. Since bit 0 of either word being compared can be a ZERO or a ONE four possible results of this comparison are possible. The action of the memory 1–10 to the results of each type of comparison is given below.

(*a*) *Both bits are ZERO or* (*b*) *Both bits are binary ONE.*—If the bit in the MIR 1–26 and the corresponding bit in the reference registers are the same (both are ZERO or both are ONE), the word being accessed may or may not be equal to the word in the reference register 1–34. Therefore, the bit sequencer 1–22 is incremented by 1 so that the next least significant bit of the same memory word can be read out and compared with the corresponding bit of the reference register 1–34 (the MIR 1–26 is cleared at this time).

(*c*) *The memory information register 1–26 bit is ZERO; the reference register bit 1–34 bit is ONE.*—In the case where the bit in the MIR 1–26 is a ZERO while the corresponding bit in the reference register 1–34 is ONE, the word being accessed cannot be equal to the word in the reference register. Therefore the memory address register (MAR) 1–14 is incremented by 1 so that the same bit of the next word in memory can be accessed and compared with the corresponding bit of the reference register.

(*d*) *The MIR 1–26 bit is ONE; the reference register 1–34 bit is ZERO.*—When this condition occurs, the word in the MAR 1–14 is numerically higher (insofar as accessing is concerned) than the word in the reference register. Because as previously noted the memory is content organized in an ordered fashion, all succeeding words will be still higher numerically. In this case neither the words previously accessed, the word being accessed, nor the following words can equal the reference word. Therefore, the memory search cycle stops at this point and provides a logic signal indicating that the reference word does not exist in memory.

The memory has provisions for testing the number in the bit sequence 1–22. This is provided by the comparator 1–24. When the bit sequencer equals the number of bits in the reference word, all bits of the reference word have been used for comparison purposes. This is noted by an equality signal from comparator 1–24. Therefore, after the least significant bits have been compared, the search cycle stops and the entire memory word at the present MAR 1–14 machine location is read out in parallel into the MIR 1–26 and compared with the reference word in register 1–34 by comparator 1–36. The bits in reference register are now in the same place as before the search cycle started. If both words are the same, the desired memory location has been determined, and is held in the MAR 1–14. Thus the information held by the memory word, over and above that used for accessing, is immediately available to the program. Sometimes when the two words are compared in parallel as indicated above, the comparison by comparator 1–36 will indicate an inequality. In this case, the reference word is not in memory, and the logic will then indicate this condition at terminal 1–46.

The memory also has provisions for testing the number in the MAR 1–14. If the MAR passes the machine address of the last word in the content-organized portion of the memory 1–10, the search cycle will stop. Since the entire memory has been unsuccessfully searched for the referenced word, the word is not in memory and the logic will then indicate this condition at terminal 1–46.

Note in FIGURE 1, the content of the MIR 1–26 is "ORed" through OR gate 1–28 into a pair of 1-bit comparators 1–30, 1–32. Thus a ONE in any bit of the MIR 1–26 is gated to the comparator. In the event that all ZERO's were in the MIR a ZERO would be gated to the comparator 1–30. This arrangement of the logic, in conjunction with implementing the reference register 1–34 as a shift register, allows any bit selected by the bit sequencer 1–22 to be compared to the most significant bit in the reference register 1–34 with only the simple 1-bit comparator 1–30.

Figure 2:
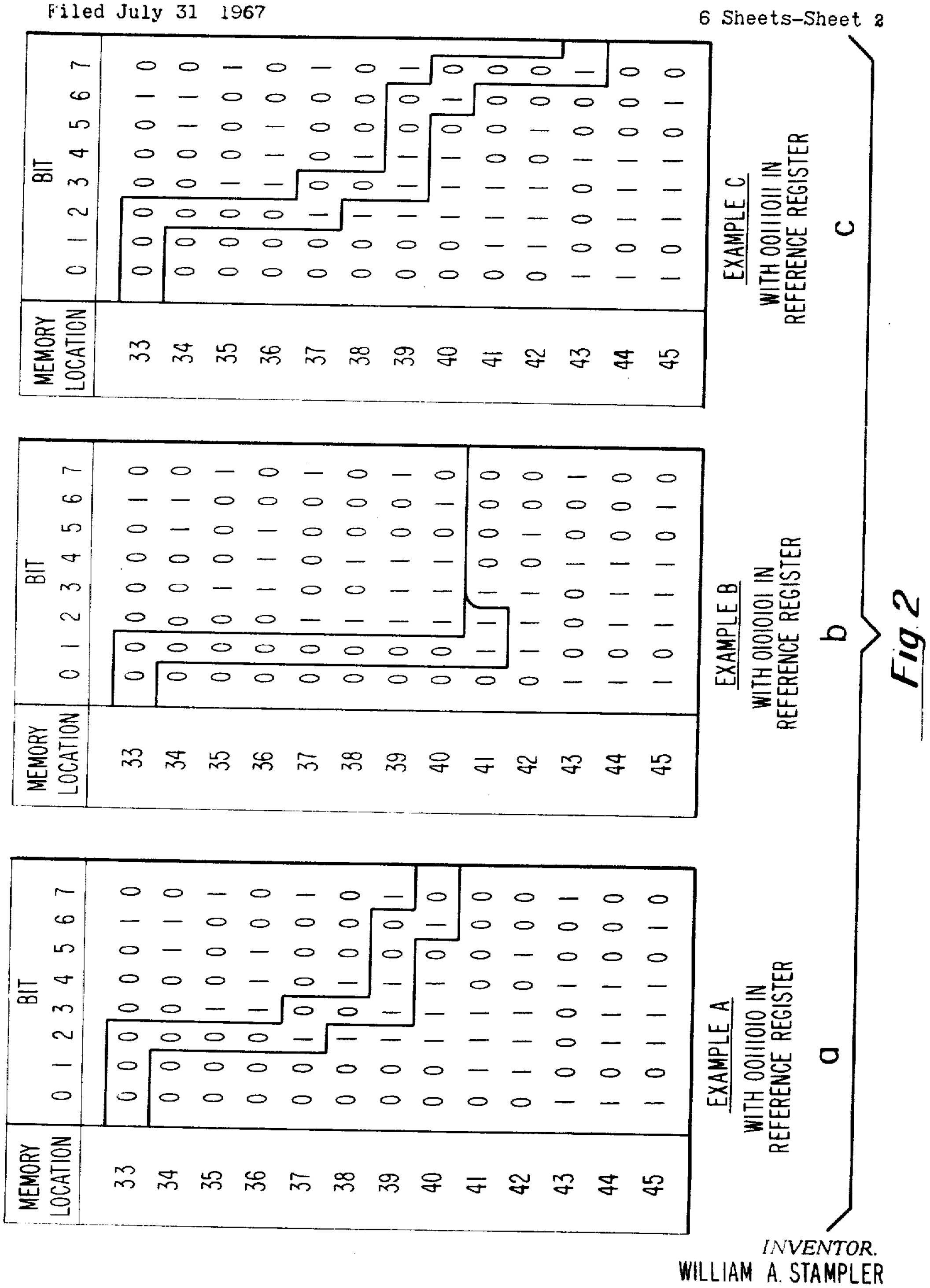
FIGURE 2 includes FIGURES *a, b,* and *c* and illustrates the path followed through the memory logic for a plurality of examples given in the description.

The manner in which this type of memory operates can be explained by the following three examples illustrated in FIGURE 2 as *a*, *b* and *c*. They will be respectively referred to in this explanation as Examples A, B and C. For simplicity, assume that memory machine locations 33 through 45 are loaded with 8-bit words as shown in the figures. The "zigzag" line running through the numbers traces the path the logic follows through memory in attempting to find the referenced word. In Example A the program calls for finding the location at which the reference word 00111010 (and its related information) is stored. Accordingly, the steps shown in the memory search algorithm (FIGURE 3) will be followed in Example A. FIGURE 2*a* shows the content of the memory for Example A.

Examples B and C illustrate searches for a word that does not exist in memory. Normally the entire contents of a conventional memory have to be read out, compared and written back one word at a time before it can be determined that a reference word has no counterpart stored in memory. The process in this disclosed method is much faster, as indicated in Examples B and C.

EXAMPLE A

Typical memory search with numerical reference to FIG. 1

The reference word 00111010 is loaded into the reference register 1–34.

The bit sequencer (BIT SEQ) 1–22 memory address register (MAR) 1–14, and the memory information register (MIR) 1–26 are cleared.

The most significant bit (bit 0) of the word in memory location 33 of memory 1–10 is transferred into the MIR 1–26 and checked to determine if it is a ZERO.

Since the accessed bit is a ZERO, it is not written back into memory. Instead it is compared with the corresponding bit in the reference register 1–34.

The comparator 1–30 determines that the bit in the MIR 1–26 is the same as the corresponding bit in the reference register 1–34. Therefore, the bit sequencer 1–22 is incremented so that bit 1 can be accessed and compared. However, the bit sequencer must be checked to make sure it is not set to a number higher than the number of bits in the reference word (8 in this example). This is shown operationally at block 3–34 of FIGURE 3.

Figure 3:
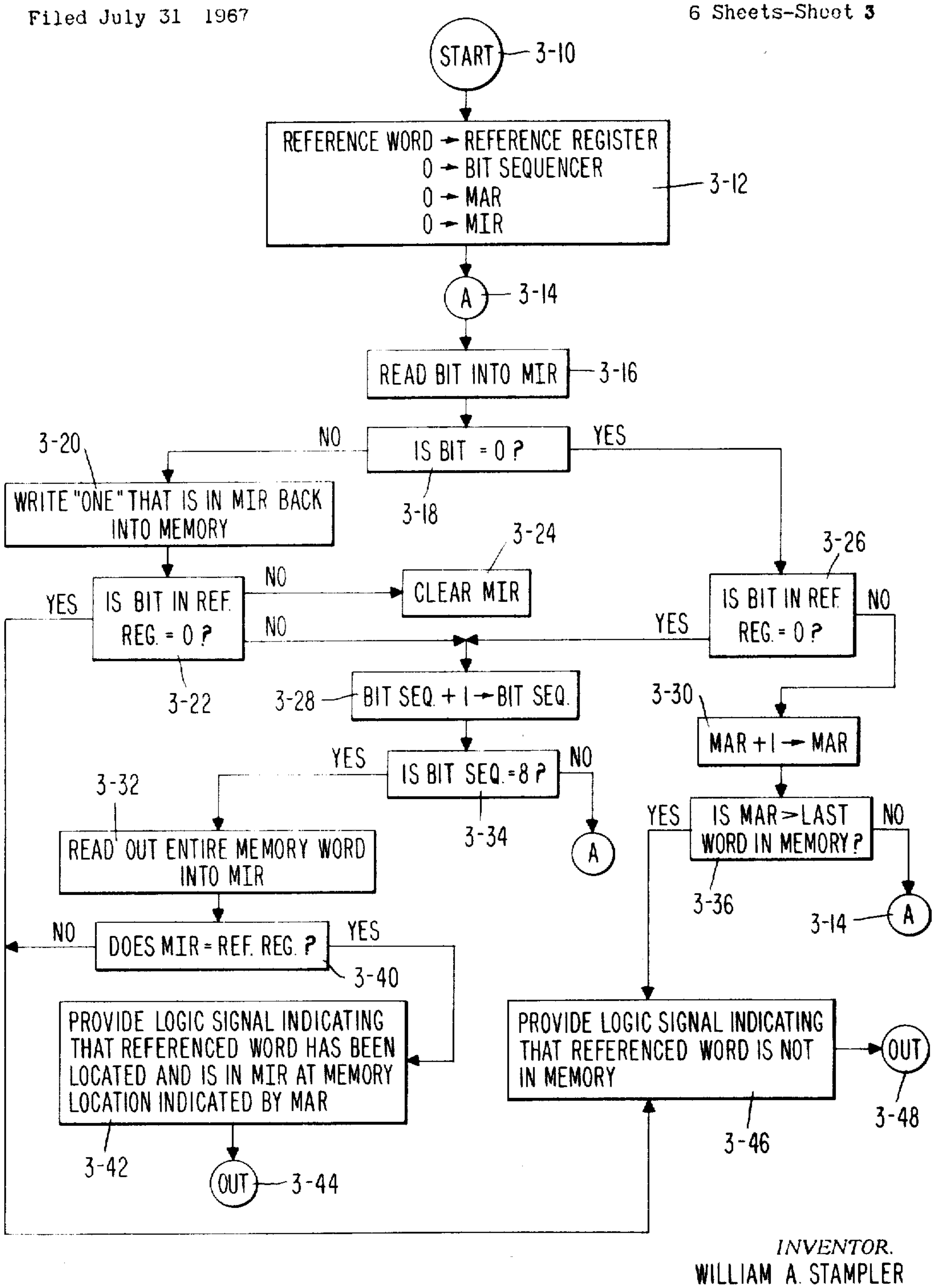
FIGURE 3 is a memory search cycle algorithm illustrating the use of the present invention.

Since in this example the bit sequencer is now set to 1, the process loops back to point Ⓐ in FIGURE 3, as shown by reference character 3–14.

Bit 1 of the word in location 33 is now placed in the MIR 1–26 and compared with the corresponding bit in the reference register 1–34. Since both are ZERO, the bit sequencer 1–22 is incremented to 2, and bit 2 of the same word is read into the MIR 1–26 for comparison by the bit comparator 1–30.

In this case, bit 2 in the MIR is ZERO, but bit 2 in the reference register is a ONE. Therefore, the MAR 1–14 is incremented via terminal 1–48 and checked to see that it has not exceeded the upper memory bound (last word in content-organized memory). Then the process loops back to point Ⓐ from block 3–36 via the line referred as 3–14. Since the MAR 1–14 was incremented in the previous step bit 2 of the word in memory location 34 is read into the MIR 1–26 and compared with the ONE in the reference register 1–34. Since they are not the same, the MAR is again incremented so the word at machine location 35 can be accessed. This process is continued until the word at location 37 is read out.

When bit 2 of the word location 37 is read out into the MIR 1–26 and checked, it is found to be a ONE. Therefore, this bit (bit 2 only) is written back into memory so that the word in memory is not altered. Then bit 2 of the MIR is compared to bit 2 of the reference register. Since both bits are ONE's, the MIR is cleared while the bit sequencer 1–22 is incremented to 3 and checked. As before, the process then loops back to point Ⓐ in the algorithm shown in FIGURE 3.

Next bit 3 of the word in location 37 is read into the MIR 1–26. Since it is a ZERO and bit 3 of the reference word is a ONE, the MAR 1–14 is incremented to location 38 and checked. This bit 3 of the word contained in location 38 is read into the MIR 1–26. Since it is also a ZERO while bit 3 of the reference word is a ONE, the MAR 1–14 is incremented to location 39 and checked.

Bit 3 of the word in location 39 is now read into the MIR 1–26. Because it is a ONE, it is immediately written back into memory 1–10. Since both bits being compared are the same (ONE's), the MIR 1–26 is cleared while the bit sequencer 1–22 is incremented to 4 and checked. Then bit 4 of the word in location 39 is read into the MIR 1–26. Because bit 4 in the MIR and bit 4 in the reference word are the same (both ONE's), the MIR is cleared while the bit sequencer is incremented to 5 and checked. Then bit 5 of the word in location 39 is read into the MIR. Further, since bit 5 in the MIR and bit 5 in the reference word are the same (both ZERO's) the bit sequencer 1–22 is incremented to 6 and checked. Then bit 6 of the word in location 39 is read into the MIR.

Bit 6 in the MIR is a ZERO, but bit 6 of the reference word is a ONE. Therefore, the MAR is incremented and checked. Then bit 6 of the word in location 40 is read into the MIR.

Both bit 6 of the MIR and bit 6 of the reference word are now the same (both ONE's) so the MIR is cleared (after the ONE is written back into memory) while the bit sequencer is incremented to 7 and checked. Then the process again loops back to point Ⓐ of FIGURE 3, and bit 7 of the word in location 40 is read into the MIR.

Both bit 7 in the MIR and bit 7 in the reference word are ZERO's so the bit sequencer is incremented to 8 and checked. It is now set to a number (8 in this example) equal to the number of bits in the reference word, indicating that all 8 bits of the reference word have been used for comparison purposes. Therefore, the entire word in location 40 is read (in parallel) into the MIR 1–26 and checked against the entire contents of the reference register 1–34 using the 8-bit comparator 1–36 shown in FIGURE 1. The comparison in this example will be true, indicating that the word being searched for is in the memory location to which the MAR is set. (Note that the word in location 40 of FIGURE 2*a* is 00111010.) The memory search has therefore been successfully completed.

EXAMPLE B

Search for a non-existent word

Assume that the same memory used in Example A is to be searched for reference word 01010101, as shown in FIGURE 2*b*. In a manner similar to Example A, bit 0 is read out and compared to bit 0 of the reference word. Since both are ZERO's the bit sequencer is incremented to 1 and the process loops back to point Ⓐ of the algorithm shown in FIGURE 3.

Next, bit 1 of the word at location 33 is read out and determined to be a ZERO. However, bit 1 of the reference word is a ONE. Therefore the MAR is incremented and bit 1 of the word at location 34 is read out and compared. This process continues with bit 1 of the words from locations 35 through 41.

When bit 1 of the word at location 41 is read out and found to be a ONE, it is immediately written back into memory 1–10. This is accomplished directly from the MIR 1–26 via one of the information drivers 1–12.

Bit 1 of the MIR is now compared with bit 1 of the reference word. Since both are ONE's the MIR is cleared while the bit sequencer is incremented to 2. Bit 2 of the word at location 41 is now read into the MIR. Since it is a ONE, it is immediately written back into memory. Bit 2 of the MIR is now compared with bit 2 of the reference word. However, bit 2 of the MIR is a ONE, while bit 2 of the reference word is a ZERO. This condition indicates that the word located at this MAR address (location 41 in Example B) and all following words are numerically higher than the reference word. The previous word (at location 40) was found earlier to be numerically less than the reference word (because bit 1 of the word in memory location 40 was a ZERO while the bit 1 in the reference word was a ONE). Therefore it has been determined that the referenced word is not in memory. Note that only 3 bits (bits 0, 1 and 2) had to be set up for accessing by the bit sequencer to determine that the word did not exist in the memory.

EXAMPLE C

Search for a non-existent word

Once again assume that the memory used in Example A is to be searched, but this time for reference word 00111011 as shown in FIGURE 2*c*. It may be noticed that this reference word is the same as the one used in Example A, except that bit 7 in this example is a ONE. Therefore, the memory search proceeds to memory location 40, bit 6 the same as for Example A.

Since both bit 6 of the MIR and the reference register are the same (ONE's), the MIR is cleared while the bit sequencer is incremented to 7. Bit 7 of the word at location 40 is read into the MIR. Since it is a ZERO while bit 7 of the reference word is a ONE, the MAR is incremented and bit 7 of the word at location 41 is read out. Note that bit 1 of this word (memory location 41) is now a ONE. Therefore the reference word cannot be in memory. However, since the logic only examies one bit at a time, it cannot determine yet that the referenced word will not be found. Accordingly, the memory search continues. Bit 7 of the word at location 41 is determined to be a ZERO while bit 7 of the reference word is a ONE. Therefore the MAR is incremented and bit 7 of the word at location 42 is examined and found unequal to bit 7 of the reference word.

Finally bit 7 of the word at location 43 is read out and found to be a ONE. It is immediately written back into memory 1–10. Here again this is directly accomplished via the MIR 1–26 and the drivers 1–12. Then a comparison shows that both bits are ONE's. The MIR is cleared while the bit sequencer is incremented to 8 and checked. It now equals the number of bits in the reference word (8 in this example). Therefore the entire contents of the word at location 43 are now read in parallel into the MIR 1–26 and compared to the reference register 1–34 by the 8-bit (full word) comparator 1–36. The comparator finds the words unequal, and causes a logic signal to be generated showing that the reference word is not in memory 1–10. Note that in Example C the MAR did not stop at the point where the reference word would be located if it were in memory. Instead, the logic caused the MAR to go past this memory location before determining that the reference word was not in memory. However, it is extremely important to note that even in this example, the entire memory did not have to be searched to determine this condition. It is equally important to note that the more words that are in a memory of this type, the quicker the cycle ends, in comparison to a complete (conventional) memory search for a word that is found not to be in memory. In general therefore, the disclosed method of memory search increases in efficiency (compared to conventional methods) with increases in memory size.

The logic described in this disclosure not only has distinct advantages in speed and cost insofar as memory search (word accessing) is concerned, but it can also be used to advantage for entering new words into or deleting unwanted words from the content-organized portion of a memory. In either case an "ordered listing" should be made, such as that shown in the algorithm of FIGURE 4. Note that the logic must include a word counter (WC). Counters suitable for this purpose are usually provided in most computers, so this requirement will not generally increase the cost of implementing the processes to be disclosed in the following algorithms.

Figure 5:
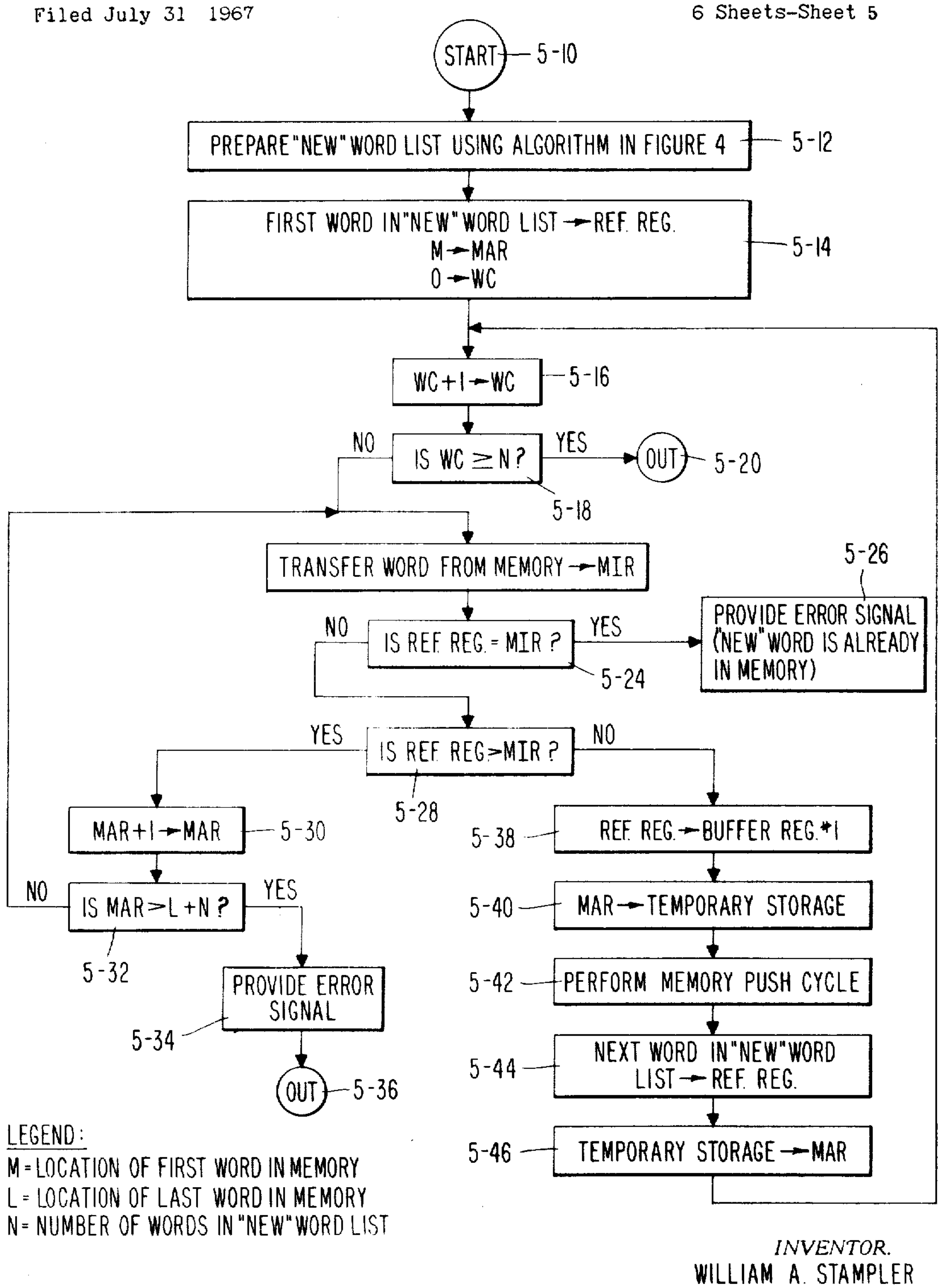
FIGURE 5 is also a memory algorithm. It is used for inserting an ordered listing of new words into the memory.

To enter new words into memory, the algorithm shown in FIGURE 5 can be used. Note that with the new words listed in numerical order before being put into the content-organized portion of the memory, the entire list can be placed in memory by only running through the entire memory at once at the most. It is suggested that the last word in a content-organized memory be made all ONE's so that the logic will never attempt to access words past the last word in the content-organized portion of the memory.

Figure 4:
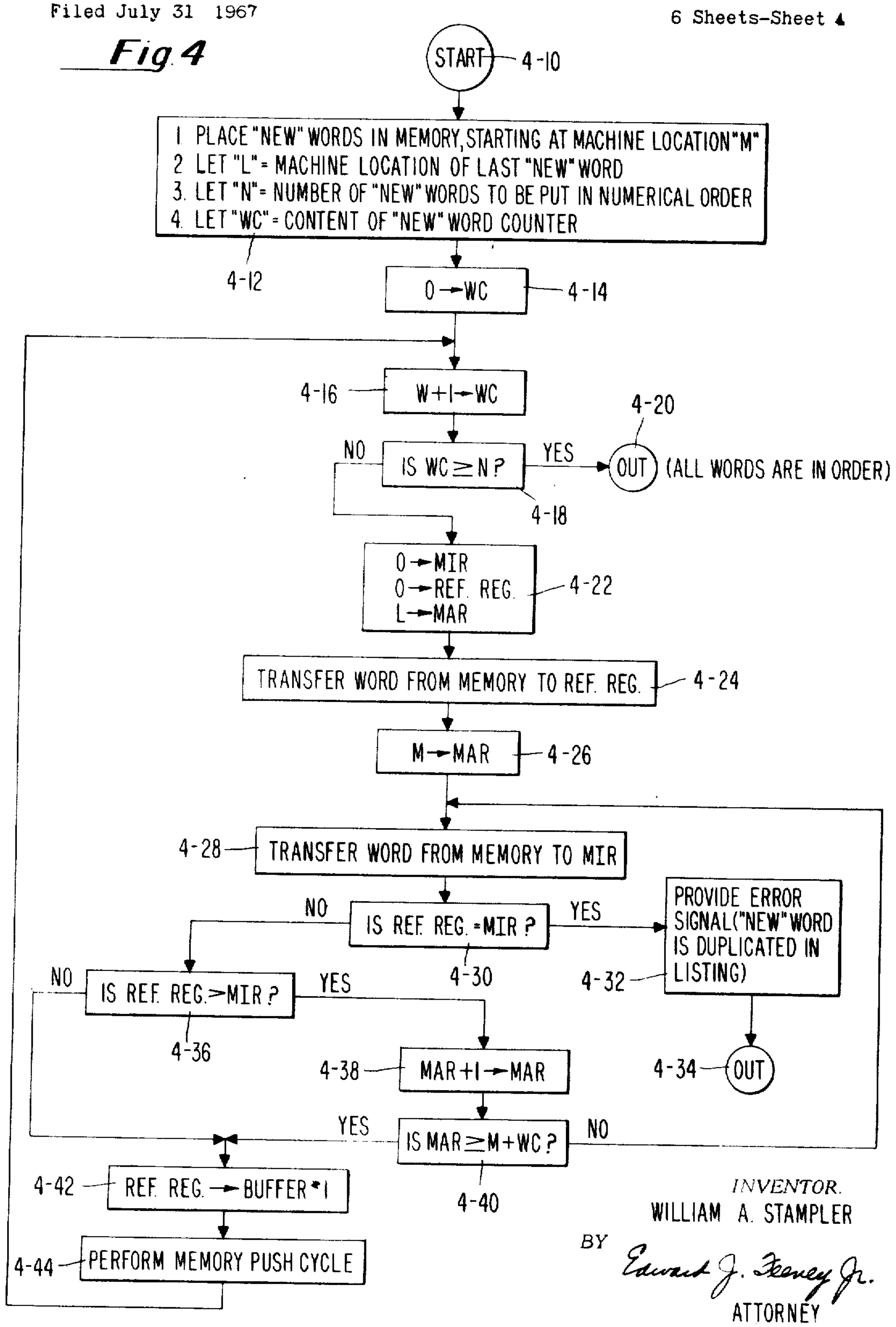
FIGURE 4 is a memory algorithm for arranging the stored words in the memory in numerical order.
Figure 6:
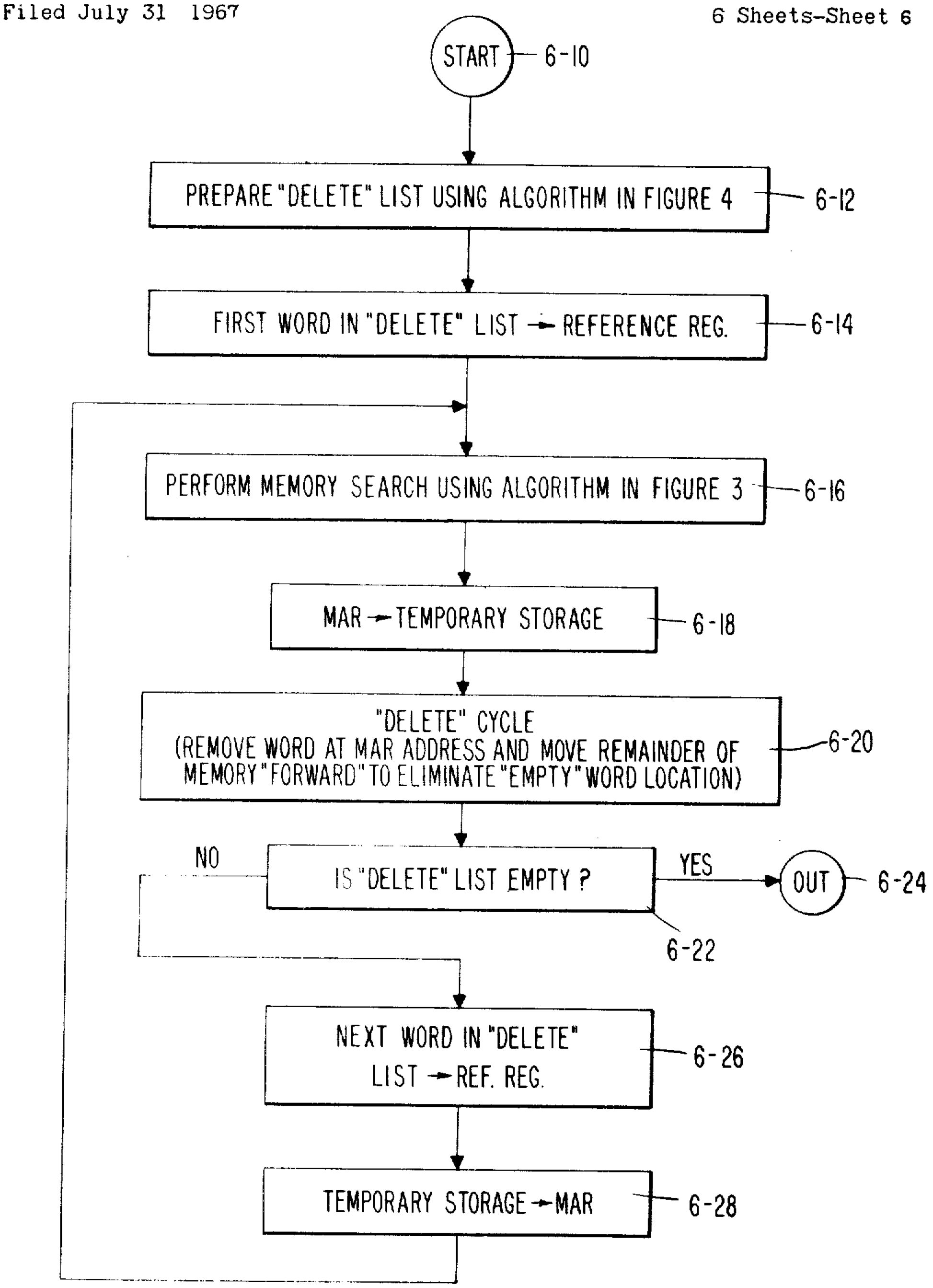
FIGURE 6 is an algorithm for deleting words from the content organized memory.

To delete words from memory, the ordered list should be prepared as shown by the algorithm in FIGURE 4. However, the delete process can utilize the "read without write" principle previously described in the disclosure. Thus the delete algorithm shown in FIGURE 6 uses the basic memory search algorithm. When the word to be deleted is found, the MAR content is stored while a delete cycle removes the unwanted word and moves all succeeding words "up" so that no "empty" words exist between the first and last words of the content-organized memory. Then the search algorithm continues where it left off, because the contents of the MAR that were stored are put back into the MAR. Thus the delete process is faster than that for adding new words into memory.

In adding new words to (or deleting old words from) memory, this disclosure has shown successive words in memory being accessed and compared to a reference word. However, a reference word may be compared to only a small part of the contents of a "word" in memory. Actually, several successive words can be stored in memory under one "reference" designation. Thus if four successive machine locations are used in connection with one reference designation, only every fourth word in memory would be compared with the reference register. In practice the MAR would be incremented by 4 instead of 1.

The push cycles would also move 4 words at once into memory in a single cycle, by using 4 buffer registers in place of the single register 1–18 in the hardware loop between the MIR 1–26 and the memory information drivers 1–12. This principle is used in the Agent Set memory previously noted to place more than one word in memory in a single push cycle. The delete cycle of FIGURE 6 could be similarly implemented.

Obviously many modifications and variations of the present invention are possible in the light of the above teachings. It is therefore to be understood that within the scope of the appended claims, the invention may be practiced other than as specifically described and illustrated.

What is claimed is:

1. A fast access content-organized memory system capable of both conventional structure addressing and content addressing comprising a memory matrix of *m* word rows and *n* bit columns with information bit driving means, information word addressing means, information bit sensing means, and information storing means connected thereto for respectively writing information into said matrix, selectively addressing words of said written information, sensing and storing said sensed information, said memory system including further means for placing said word information into the memory in numerical order and means for reading out, when required during a search operation, one bit at a time, in addition to means for the conventional parallel reading out of all bits of a selected word simultaneously.

2. The memory system as set forth in claim 1 above, wherein said system further includes a reference word storing means, means for comparing the individually read out bits from the memory matrix with the individual bits of the reference word housed in the reference word storing means, the single bit comparing means including indicating means corresponding to equality and inequality.

3. The memory system as set forth in claim 2 wherein said indicating means further includes means for reading out the next bit in the same information word when said comparing means indicates equality and means for reading out the same bit in the next information word when said comparing means indicates inequality.

4. The memory system as set forth in claim 3 wherein said means for reading out the next bit in the same information word includes a bit sequencing means having a plurality of output terminals which are sequentially activated in response to successive equality signals from said single bit comparator, a plurality of AND gates each connected to one of said output terminals of the sequencing means, said AND gates, in turn, being connected to the individual bits of the selectively addressed word for reading out said bits in response to the successive application of a read signal from a read signal source commonly connected to all of said AND gates.

5. A fast access memory system capable of both conventional structure addressing and content addressing comprising a memory means organized of *m* word rows and *n* bit columns, a plurality of bit information drivers connected to said memory to insert information into the respective bit columns, a memory address register connected to said memory to individually address the word rows of said memory means, a plurality of sense amplifiers coupled to the bit columns of the memory, a memory information register connected to the sense amplifiers to receive and store the output signals from said sense amplifiers, an OR gate commonly connected to all of the bit positions of said memory information register, a plurality of AND gates respectively connected to each of the bit locations of all of the word rows of said memory, a read pulse source commonly connected to all of said AND gates, a bit sequencing means having a plurality of output terminals which are sequentially activated, each of said output terminals respectively connected to one of said AND gates to thereby sequentially activate said gates in response to the simultaneous application of a read pulse from said read pulse source and the sequentially occurring pulses from said sequencing means, a reference register to store the reference word sought in the memory, and a single bit comparator connected between said reference register and said OR gate to individually compare the bits of said reference register and the bits sequentially read out of memory.

6. The fast access memory system as set forth in claim 5 further comprising a multiple bit comparator connected between said reference register and said memory information register to provide simultaneous comparison of more than one bit of said reference register with more than one bit of said memory information register.

7. The fast access memory system as set forth in claim 5 further comprising a second single bit comparator connected between said OR gate, a source of binary ONE signals and said memory to reinsert a binary ONE signal into said memory at the same location each time a binary ONE signal is read out.

8. The fast access memory system as set forth in claim 5 further comprising a memory address comparator connected between the memory address register and a source of information containing the address of the last memory word, said comparator including indicating means to denote the end of a search cycle when said memory address register contents correspond to the address of the last memory word.

9. The fast access memory system as set forth in claim 5 wherein said system further includes a buffer register connected in parallel between the memory information drivers, the memory information register and the reference register to provide means capable of performing a push cycle operation of the memory system wherein the contents of the memory information register are returned in parallel to the memory means and advanced to the next successive location in its proper numerical order.

References Cited

UNITED STATES PATENTS

| | | | |
|---|---|---|---|
| 3,292,159 | 12/1966 | Koerner | 340—172.5 |
| 3,297,995 | 1/1967 | Koerner et al. | 340—172.5 |
| 3,299,409 | 1/1967 | Herman | 340—172.5 |
| 3,300,766 | 1/1967 | Koerner et al. | 340—174 |
| 3,389,377 | 6/1968 | Cole | 340—172.5 |
| 3,402,394 | 9/1968 | Koerner et al. | 340—172.5 |

BERNARD KONICK, Primary Examiner

J. F. BREIMAYER, Assistant Examiner

U.S. Cl. X.R.

340—172.5, 173